J. JAMES.
TROLLEY WHEEL MOUNT.
APPLICATION FILED JUNE 1, 1914.
1,149,447.
Patented Aug. 10, 1915.
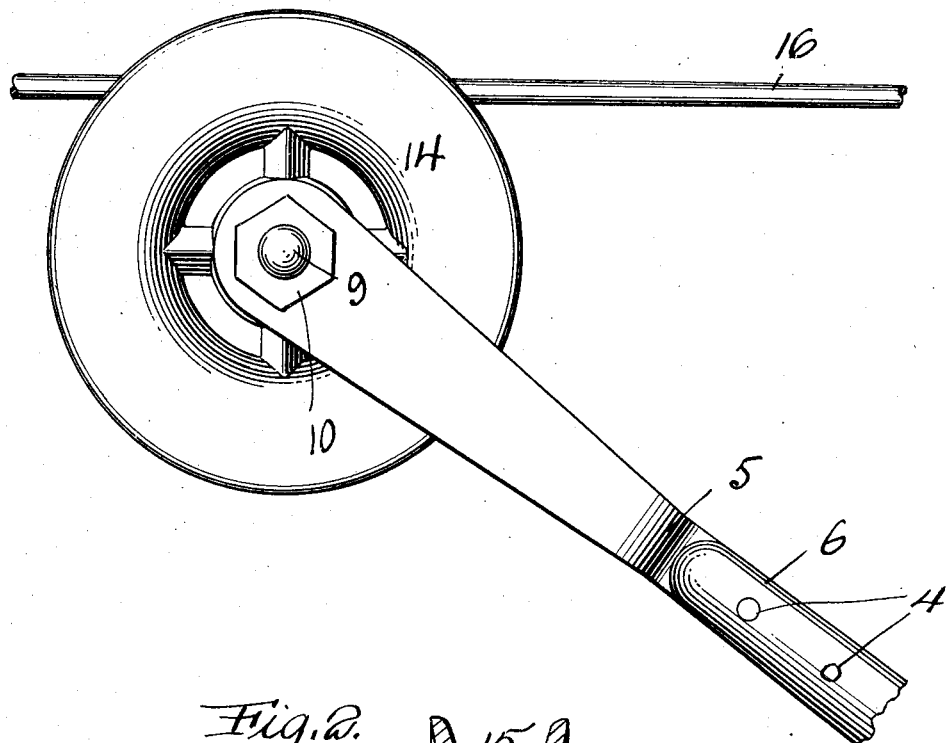
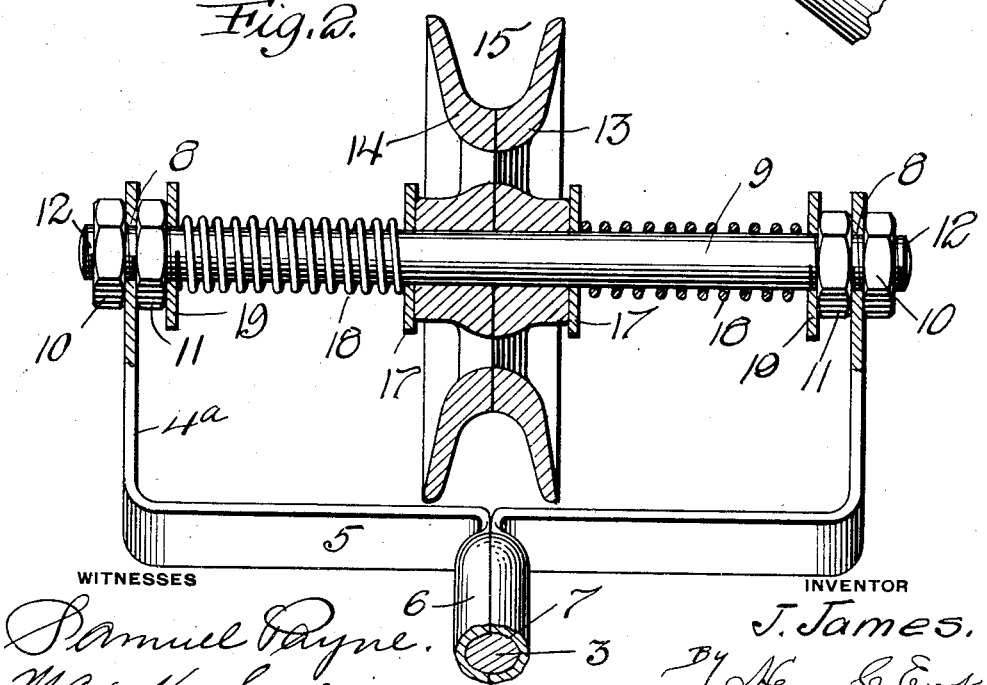
WITNESSES
Samuel Payne.
Max H. Sivlong
INVENTOR
J. James.
By Henry C. Evert
ATTORNEY

UNITED STATES PATENT OFFICE.

JOHN JAMES, OF WOODLAWN, PENNSYLVANIA.

TROLLEY-WHEEL MOUNT.

1,149,447.  Specification of Letters Patent.  Patented Aug. 10, 1915.

Application filed June 1, 1914. Serial No. 841,971.

*To all whom it may concern:*

Be it known that I, JOHN JAMES, a citizen of the United States of America, residing at Woodlawn, in the county of Beaver and State of Pennsylvania, have invented certain new and useful Improvements in Trolley-Wheel Mounts, of which the following is a specification, reference being had therein to the accompanying drawing.

This invention relates to trolleys, and has for its object to provide a device of such class, with means in a manner as hereinafter set forth for maintaining the trolley wheel in connection with the trolley wire, especially when rounding curves.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claim hereunto appended.

In the drawings, wherein like reference characters denote corresponding parts throughout the several views:—Figure 1 is a side elevation of a trolley in accordance with this invention, and Fig. 2 is a front elevation, partly in section.

Referring to the drawings in detail, the trolley comprises a pole 3, to the upper end of which is secured by the holdfast devices 4, a harp. The harp consists of a pair of angle-shaped sections including an upwardly extending arm $4^a$, and a horizontally disposed arm 5. Each of the horizontally disposed arms 5 has its inner end terminating in a semi-cylindrical socket forming member 6. The members 6 oppose each other to provide a socket 7, for the reception of the upper end of the pole 3, and through said socket forming member 6 and the upper end of the pole 3 extend the holdfast devices 4, whereby the harp is fixedly secured to the pole 3.

Each of the upright arms $4^a$ of the harp near its free end is provided with an opening 8, and extending through said openings 8 is a shaft 9, provided on its ends with nuts 10, which abut against the outer face of the arms $4^a$, and said shaft 9 is further provided with nuts 11, which abut against the inner face of the arms $4^a$. The ends of the shaft 9 are threaded as at 12, for the reception of the nuts 10 and 11, and these latter fixedly secure the shaft 9 to the harp.

Journaled upon the shaft 9, is a trolley wheel formed of two sections 13 and 14, which are so shaped as to provide a peripheral groove 15, the wall of which travels against the trolley wire 16, when the trolley wheel 13 revolves. The sections 13 and 14 of the trolley wheel are provided with plates 17, and bearing against said plates 17 are coiled springs 18, for maintaining the sections 13 and 14 of a trolley wheel in abutting engagement and said springs furthermore constitute means for maintaining the trolley wheel centrally of the shaft 9, and also allow of the trolley wheel shifting upon said shaft when occasion so requires, after being shifted to restore the wheel to normal position which is centrally of the shaft 9.

The springs 18 surround the shaft 9, and are interposed between the plate 17 and stop collars 19, which are mounted upon the shaft 9. The nuts 11 arrest movement of the collars 19 in one direction.

What I claim is:—

A trolley wheel mount including a pole, a harp formed in sections and having a socket receiving one end of the pole therein, an axle removably mounted in the arms of said harp and having the ends thereof threaded, portions of said axle projecting beyond the arms of the harp, nuts engaged with the projecting ends of said axle to secure the latter in place, a trolley wheel formed in two sections loosely mounted on said axle, coil springs encircling said axle, between the sections of said wheel and the arms of the harp, whereby to retain the two sections together in operative position and additional nuts on the threaded portions of the axle interposed between the arms of the harp and the ends of the springs, whereby to adjust the tension of said springs in the securing of the sections of the wheel together.

In testimony whereof I affix my signature in the presence of two witnesses.

JOHN JAMES.

Witnesses:
R. B. SMITH,
ABRAHAM JOHNS.

Copies of this patent may be obtained for five cents each, by addressing the "Commissioner of Patents, Washington, D. C."